United States Patent
Li et al.

(10) Patent No.: US 6,691,033 B1
(45) Date of Patent: Feb. 10, 2004

(54) SYSTEM AND METHOD FOR CALIBRATING INTER-STAR-TRACKER MISALIGNMENTS IN A STELLAR INERTIAL ATTITUDE DETERMINATION SYSTEM

(75) Inventors: Rongsheng Li, Hacienda Heights, CA (US); Yeong-Wei Andy Wu, Rancho Palos Verdes, CA (US); Douglas H. Hein, Los Angeles, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 127 days.

(21) Appl. No.: 09/625,392

(22) Filed: Jul. 26, 2000

(51) Int. Cl.$^7$ .......................... G01C 21/00; G06G 7/78; B64G 1/24; B64G 1/36; F02K 1/00
(52) U.S. Cl. ...................... 701/222; 701/207; 701/220; 701/228; 701/226; 342/357.02; 342/357.04; 244/164; 244/171; 73/178 R
(58) Field of Search ................................. 701/207, 222, 701/220, 224, 226; 342/356, 357.02, 357.04; 244/164, 165, 171; 73/178 R

(56) References Cited

U.S. PATENT DOCUMENTS

| | | | | |
|---|---|---|---|---|
| 5,108,050 A | * | 4/1992 | Maute ........................ 244/164 |
| 5,109,346 A | * | 4/1992 | Wertz ........................ 701/226 |
| 5,204,818 A | * | 4/1993 | Landecker et al. ......... 244/164 |
| 5,348,255 A | * | 9/1994 | Abren ........................ 244/171 |
| 5,396,326 A | * | 3/1995 | Knobbe et al. ............. 356/255 |
| 5,412,574 A | * | 5/1995 | Bender et al. .............. 701/222 |
| 5,556,058 A | * | 9/1996 | Bender ....................... 244/171 |
| 5,562,266 A | * | 10/1996 | Achkar et al. .............. 244/171 |
| 5,672,872 A | * | 9/1997 | Wu et al. .................... 250/330 |
| 5,749,545 A | * | 5/1998 | Gnatjuk ...................... 244/164 |
| 5,783,825 A | * | 7/1998 | Wiese ......................... 250/330 |
| 5,790,071 A | * | 8/1998 | Silverstein et al. .......... 342/354 |
| 5,821,526 A | * | 10/1998 | Krishna ................... 250/203.6 |
| 5,852,792 A | * | 12/1998 | Nielson ....................... 701/222 |
| 5,984,238 A | * | 11/1999 | Suraurer et al. ............. 244/171 |
| 6,047,226 A | * | 4/2000 | Wu et al. ...................... 701/13 |
| 6,108,593 A | * | 8/2000 | Didinsky et al. .............. 701/13 |
| 6,108,594 A | * | 8/2000 | Didinsky et al. .............. 701/13 |
| 6,131,058 A | * | 10/2000 | Boeinghoff et al. ........... 701/34 |
| 6,145,790 A | * | 11/2000 | Didinsky et al. ............ 244/164 |
| 6,227,496 B1 | * | 5/2001 | Yoshikawa et al. .......... 244/171 |
| 6,236,939 B1 | * | 5/2001 | Wu et al. .................... 701/222 |
| 6,266,616 B1 | * | 7/2001 | Needelman ................. 701/222 |
| 6,272,432 B1 | * | 8/2001 | Li et al. ...................... 701/222 |

* cited by examiner

*Primary Examiner*—William A. Cuchlinski, Jr.
*Assistant Examiner*—Brian J. Broadhead
(74) *Attorney, Agent, or Firm*—Gates & Cooper LLP

(57) ABSTRACT

A method and apparatus for determining star tracker misalignments is disclosed. The method comprises the steps of defining a defining a reference frame for the star tracker assembly according to a boresight of the primary star tracker and a boresight of a second star tracker wherein the boresight of the primary star tracker and a plane spanned by the boresight of the primary star tracker and the boresight of the second star tracker at least partially define a datum for the reference frame for the star tracker assembly; and determining the misalignment of the at least one star tracker as a rotation of the defined reference frame.

27 Claims, 9 Drawing Sheets

SYSTEM AND METHOD FOR CALIBRATING INTER-STAR-TRACKER MISALIGNMENTS IN A STELLAR INERTIAL ATTITUDE DETERMINATION SYSTEM

STATEMENT OF RIGHTS OWNED

This invention was made with government support. The government has certain rights in this invention.

The invention described herein was made in the performance of work under NASA Contract Number NAS5-98069 and is subject to the provisions of Section 305 of the National Aeronautics and Space Act of 1958 (72 Stat. 435; 42U.S. C 2457).

BACKGROUND OF THE INVENTION

1. Field of the Invention

The present invention relates to systems and methods for navigation and control of spacecraft, and in particular to a system and method for determining the inter-star-tracker misalignments of a star tracker assembly consisting of two or more star-trackers.

2. Description of the Related Art

Satellites enjoy widespread use for a variety of applications, including communications, surveillance, and data gathering. To perform their design mission, most satellites require accurate information regarding the spacecraft and payload attitude.

For applications where high bandwidth satellite attitude data is required, such data is typically obtained by on-board inertial measurement instruments such as inertial reference units having a plurality of gyros and accelerometers. However, while such instruments can provide high bandwidth information regarding the spacecraft attitude, they can only do so with respect to a attitude reference, which can be provided by a star tracker assembly (STA) having a suite of star trackers. Errors in the attitude reference propagate throughout the satellite navigation system. One source of such errors is the misalignment of the star trackers of the STA with respect to one another, and a misalignment of the STA itself with respect to the satellite body. Unless effectively nulled out or otherwise accounted for, such errors can negatively impact the satellite's ability to carry out its service mission. What is needed is an effective method for estimating such STA misalignments and using those estimated misalignments to correct for satellite navigation errors. The present invention satisfies that need.

SUMMARY OF THE INVENTION

To address the requirements described above, the present invention discloses a method and apparatus for determining star tracker misalignments. The method comprises the steps of defining a reference frame for the star tracker assembly according to a boresight of the primary star tracker and a boresight of a second star tracker, wherein the boresight of the primary star tracker and a plane spanned by the boresight of the primary star tracker and the boresight of the second star tracker at least partially define a datum for the reference frame for the star tracker assembly; and determining the misalignment of the at least one star tracker as a rotation of the defined reference frame. In another embodiment, the method comprises the steps of measuring a position of a first star with the first star tracker; transforming the measured position of the first star in a second star tracker reference frame; measuring a position of a second star with the second star tracker; transforming the measured position of the second star in a first star sensor reference frame; identifying the first star and the second star; determining a reference position of the identified first star and the identified second star from a star catalog; computing an inner product of the measured position of the first star and the second star and the reference position of the identified first star and the identified second star, the inner product representing an error in the measured star positions. This process is repeated for a third star measured by the first star tracker and a fourth star measured by the second star tracker. The errors in the measured star positions from these measurements and transformations are equated with a measurement error equation having error parameters, $$\begin{bmatrix} {}^{ST1}\delta\theta_z \\ \delta\gamma \\ {}^{ST2}\delta\theta_z \end{bmatrix},$$

wherein ${}^{ST1}\delta\theta_z$ represents a first misalignment angular error about a boresight of the primary star tracker, $\delta\gamma$ represents a second misalignment angular error as a separation angle error between the boresight of the primary star tracker and a boresight of the second star tracker, and ${}^{ST2}\delta\theta_z$ represents the third misalignment angular error as an angular rotation angle about the boresight of the second star tracker. Using the errors in the measured positions of the first, second, third, and fourth stars, the measurement error equation for the error parameters is solved.

The present invention can also be described as an apparatus having a transformation module for transforming the position of a first star and a third star measured by the primary star tracker into a reference frame for a second star tracker and for transforming the position of a second star and a fourth star measured by a second star tracker into a reference frame for the primary star tracker; a star catalog, including reference position for each star described therein; a module for computing an inner product of a measured position of the first star and a measured position of the second star and a reference position of the first star and a reference position of the second star and a measured position of the third star and a measured position of the fourth star and a reference position of the third star and a reference position of the fourth star, the inner products representing an error in the respective measured star positions; a processor for equating the error in the measured star positions with a measurement error equation having error parameters, $$\begin{bmatrix} {}^{ST1}\delta\theta_z \\ \delta\gamma \\ {}^{ST2}\delta\theta_z \end{bmatrix},$$

wherein ${}^{ST1}\delta\theta_z$ represents a first misalignment angular error about a boresight of the primary star tracker, $\delta\gamma$ represents a second misalignment angular error as a separation angle error between the boresight of the primary star tracker and a boresight of the second star tracker, and ${}^{ST2}\delta\theta_z$ represents the third misalignment angular error as an angular rotation angle about the boresight of the second star tracker, and for solving the measurement error equation for the error parameters.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
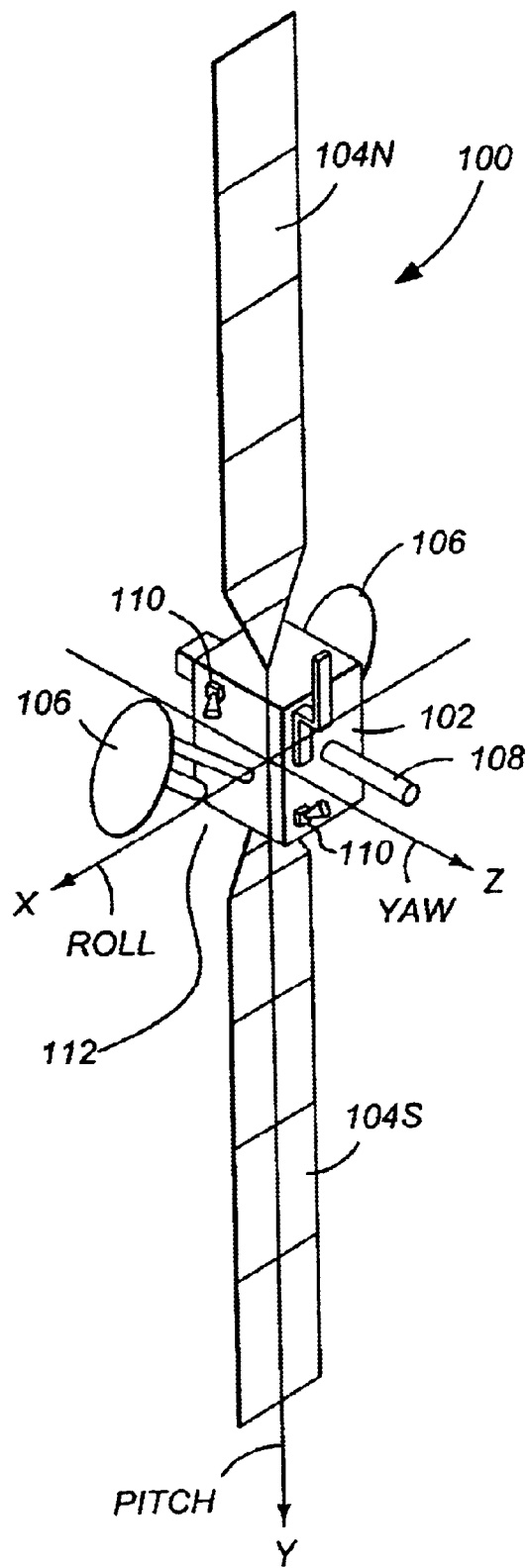
FIG. 1 illustrates a three-axis stabilized satellite or spacecraft.

FIG. 1 illustrates a three-axis stabilized satellite or spacecraft 100. The spacecraft 100 is preferably situated in a stationary orbit about the Earth. The satellite 100 has a main body 102, a pair of solar panels 104, a pair of high gain narrow beam antennas 106, and a telemetry and command omnidirectional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

FIG. 1 also illustrates the spacecraft 100 reference frame 112. This reference frame 112 is a body-fixed, non-inertial frame defined so that an object attached to the spacecraft body 102 has an essentially constant position with respect to that frame, regardless of how its position changes in other reference frames to another reference frame such as an earth-centered inertial (ECI) reference frame. The attitude is the orientation of the body-fixed frame with respect to an inertial frame.

The Y (pitch) axis is chosen to be parallel to the solar panel 104 longitudinal axis. The solar panels 104 are designed to rotate about that axis, but the axis itself is typically fixed in the body frame. The X and Z axes are normal to faces of the spacecraft body 102. The X axis, which typically "points" in the direction of spacecraft 100 motion, is the roll axis and the Z axis, which typically "points" to Earth, is the yaw axis. As this frame is body-fixed, even if the spacecraft 100 is at an orientation where the X and Z axes are not pointing in the direction of motion, and Earth 302, respectively, the axes do not change. They are still defined as in FIG. 1.

Figure 2:
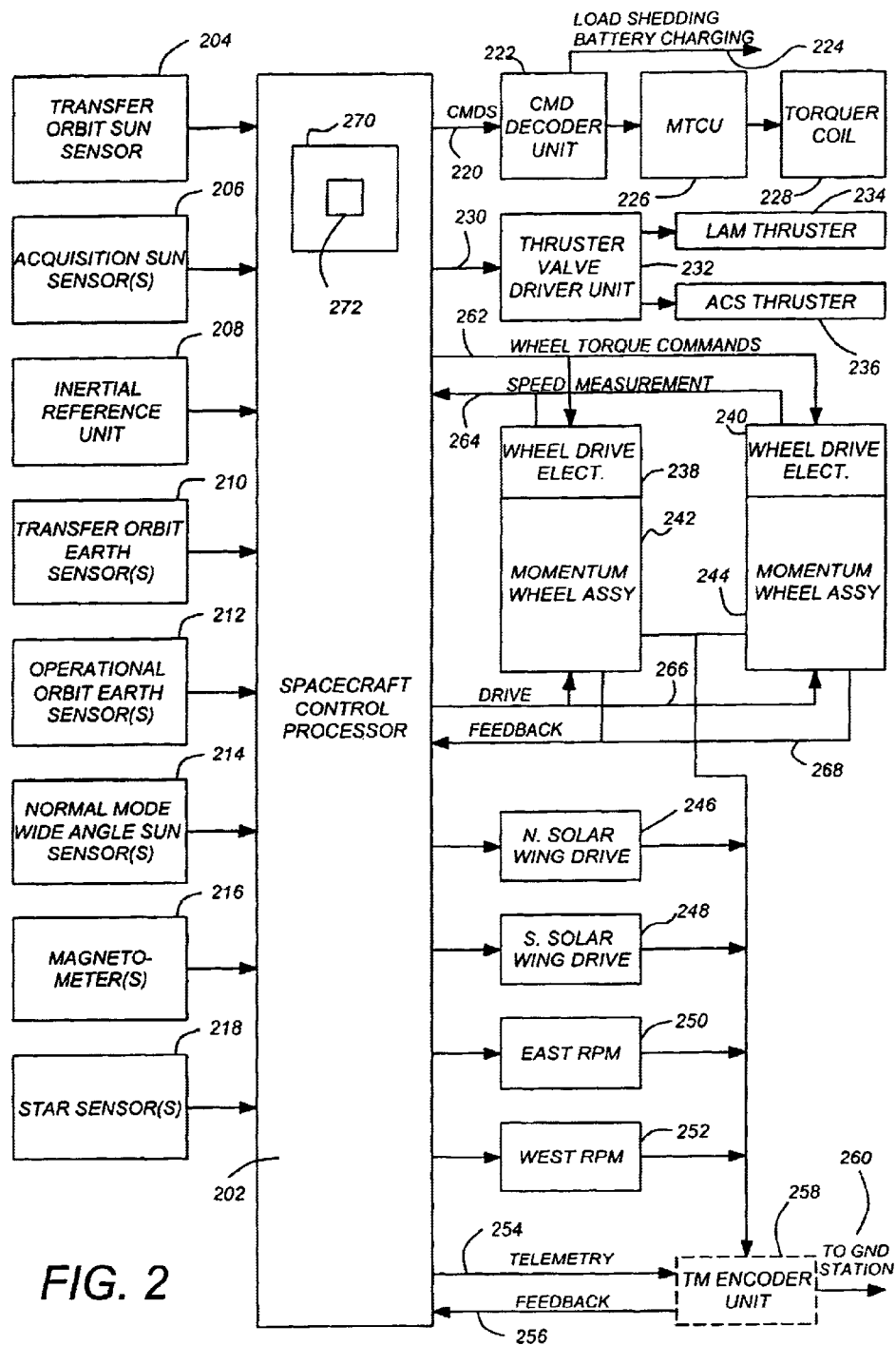
FIG. 2 is a diagram depicting the functional architecture of a representative attitude control system.

FIG. 2 is a diagram depicting the functional architecture of a representative attitude control system. Control of the spacecraft is provided by a computer or spacecraft control processor (SCP) 202. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to ascent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanism mode control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 that are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Wheel torque commands 262 are generated by the SCP 202 and are communicated to the wheel speed electronics 238 and 240. These effect changes in the wheel speeds for wheels in momentum wheel assemblies 242 and 244, respectively. The speed of the wheels is also measured and fed back to the SCP 202 by feedback control signal 264.

The spacecraft control processor also sends jackscrew drive signals 266 to the momentum wheel assemblies 243 and 244. These signals control the operation of the jackscrews individually and thus the amount of tilt of the momentum wheels. The position of the jackscrews is then fed back through command signal 268 to the spacecraft control processor 202. The signals 268 are also sent to the telemetry encoder unit 258 and in turn to the ground station 260.

The spacecraft control processor also sends command signals 254 to the telemetry encoder unit 258 that in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260. Data received may also be received by the telemetry encoder unit 258 from the ground station 260 and passed to the SCP 202.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the spacecraft as required.

The use of reaction wheels or equivalent internal torquers to control a momentum bias stabilized spacecraft allows inversion about yaw of the attitude at will without change to the attitude control. In this sense, the canting of the momentum wheel is entirely equivalent to the use of reaction wheels.

Other spacecraft employing external torquers, chemical or electric thrusters, magnetic torquers, solar pressure, etc. cannot be inverted without changing the control or reversing the wheel spin direction. This includes momentum bias spacecraft that attempt to maintain the spacecraft body fixed and steer payload elements with payload gimbals.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Reference Frames Used in Attitude Determination

Spacecraft attitude is the orientation of the spacecraft 100 with respect to some known reference frame.

One possible reference frame is fixed with respect to both the Earth 302 and the Sun 304. This reference frame is useful because the satellite's mission is usually concerned primarily with pointing antennae at the Earth 302, and directing the solar panels 104 to at the Sun 304. Attitude determination in such a frame requires finding where the centers of the Sun and Earth are with respect to the spacecraft.

One problem with using such a reference frame is that it is hard to determine exactly where the center of the Sun and/or Earth is with respect to a spacecraft at any given time. Sun sensors 214 and Earth sensors 212, which are used for such purposes, give errors of approximately 0.02 degree and 0.05 degree, respectively. Hence, attitude estimates based on such readings will be off by 0.02 degree, or more. In many cases, this accuracy is insufficient to meet current satellite mission requirements.

The attitude of the spacecraft can also be expressed in accordance with an inertial reference frame. The attitude of the spacecraft 100 in an inertial reference frame can be determined directly from the observation of inertially fixed objects, such as stars, instead of moving objects such as the Sun and Earth. Because a typical star sensor 218 is accurate to about 15 arc-seconds (0.004 degree), attitude estimates formulated using star trackers are more accurate than estimates formulated using conventional Sun and Earth sensors 214 and 212. Once the spacecraft attitude is known in the inertial reference frame, the orbital information of the spacecraft, the Sun, and the Earth can be used to compute the angular positions of the Sun and the Earth relative to the satellite 100.

Figure 3:
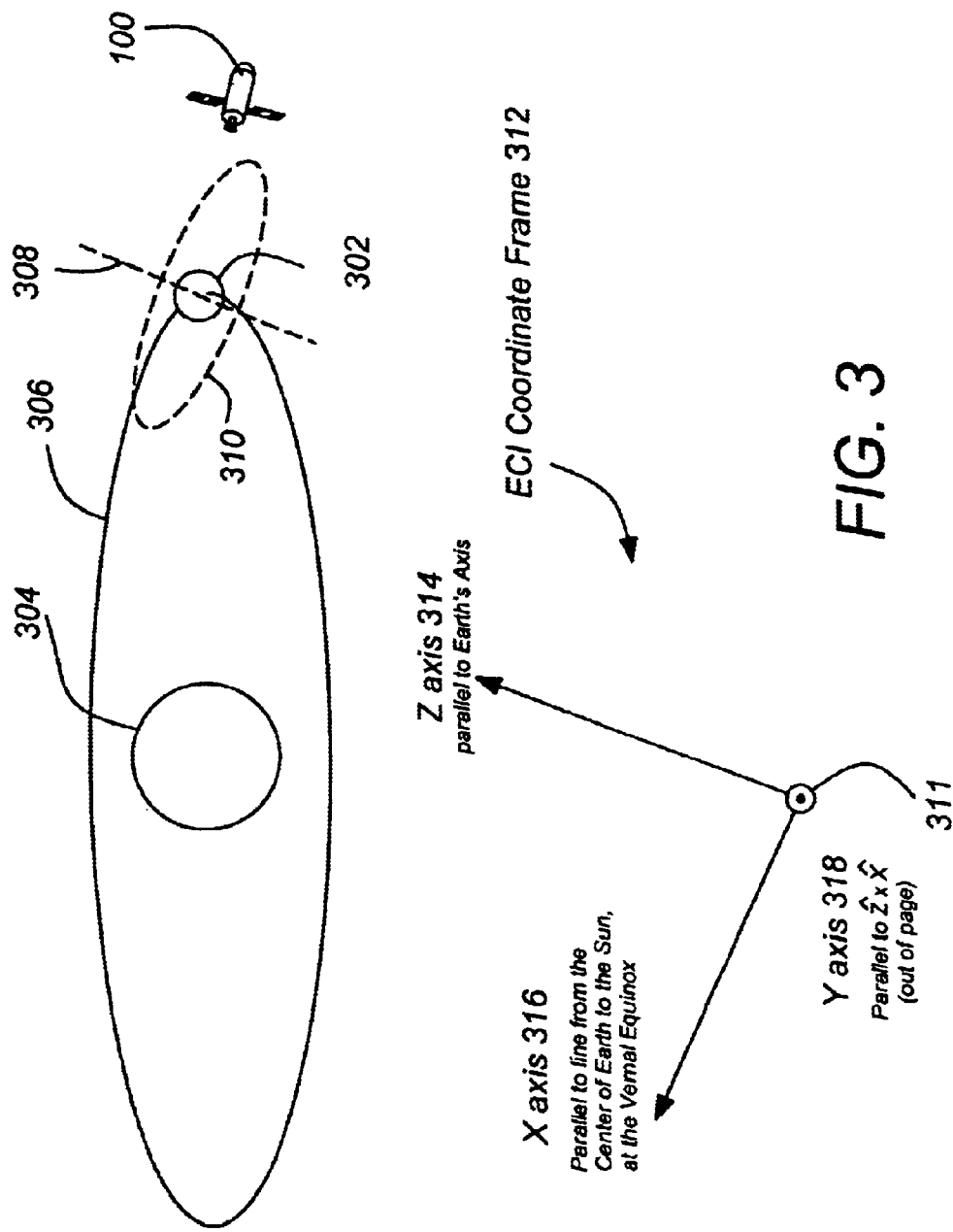
FIG. 3 is a diagram showing an Earth-Centered Inertial (ECI) reference frame.

FIG. 3 is a diagram showing an Earth-Centered Inertial (ECI) reference frame 312 used for one embodiment of the method described herein. The origin 310 of the ECI reference frame 312 (where the X axis 316, the Y axis 318, and the Z axis 314 meet) is defined at the current position of the satellite 100. The position of the origin changes in time, but the orientation of axes 314–318 do not. The Z-axis 314 is taken to be parallel to Earth's spin axis 308, pointing North. The X and Y axes are perpendicular to the Z-axis 314, and are therefore parallel to vectors lying in Earth's 302 equatorial plane 311. The X-axis 316 is chosen to be parallel to a line lying in the plane of the ecliptic 306 (the plane containing the orbits of the planets), as well as the equatorial plane. The X axis 316 can be defined as the line from the center of the Earth 302 to the Sun 304 at the vernal equinox (March 21). The stars' positions in this frame are referenced by unit vectors pointing from the spacecraft 100 to the star. Throughout this disclosure, all vectors are taken to be of unit length, unless specified otherwise. The star positions are nearly fixed in the ECI reference frame 312.

Since the origin of the frame is at the spacecraft position, spacecraft motion affects ECI position of the stars. However, in practice, the stars are far enough away so that the unit vectors remain essentially constant as the spacecraft moves. The above definition of the ECI reference frame 312 also ignores the fact that the orientation of Earth's axis changes over time. This is because the Earth precession period is about 26,000 years. Therefore, the axes 314–318 of the ECI reference frame 312 is often specified with respect to a particular time (e.g., noon, Jan. 1, 2000).

Star Tracker Reference Frames

Figure 4:
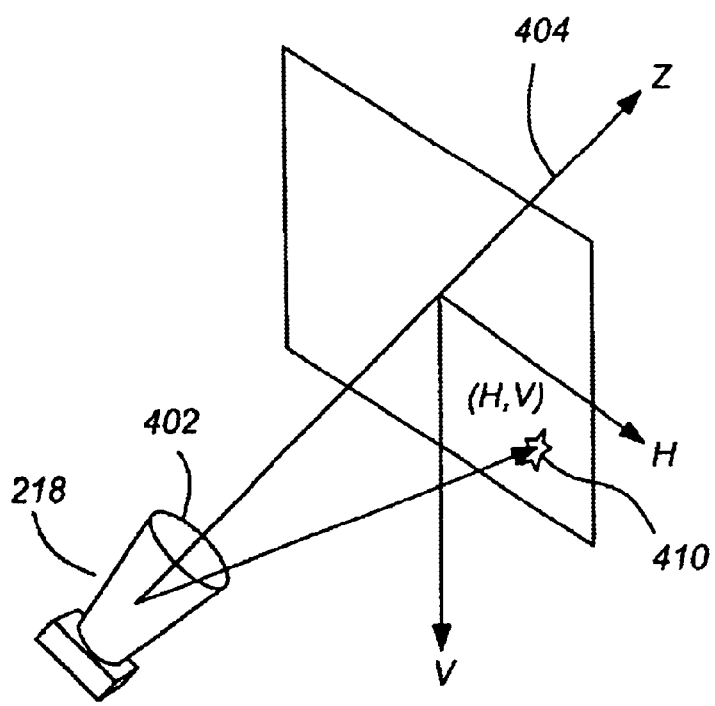
FIG. 4 is a diagram showing a reference frame for a typical star sensor.

FIG. 4 is a diagram showing a reference frame for a typical star sensor 218 and sun shade 402. In most cases, star sensors 218 (hereinafter alternatively referred to as star trackers) make star observations with respect to a body-fixed reference frame pertaining to the star tracker only.

The star tracker 218 reports stars 410 at horizontal and vertical Cartesian coordinate positions ($H_1$, $V_1$) in the star tracker's field-of-view (FOV). These ($H_1$, $V_1$) positions may be converted to a unit vector expressed in the star tracker's reference frame as follows:

$$^{ST1}U_1(k) \equiv \begin{bmatrix} ^{ST1}U_1(1,k) \\ ^{ST1}U_1(2,k) \\ ^{ST1}U_1(3,k) \end{bmatrix} = \frac{1}{\sqrt{1+H_1^2(k)+V_1^2(k)}} \begin{bmatrix} H_1(k) \\ V_1(k) \\ 1 \end{bmatrix} \quad \text{Equation (1)}$$

wherein in the notation $^{ST1}U_1^m(k)$, ST1 indicates that the unit vector is represented in the coordinate frame (h, v, z) of a first star tracker ST1, the "1" subscript indicates that the unit vector is for a star observed by the first star tracker ST1, the "m" indicates that the value is a measured value, and the "k" in the parentheses indicates that the unit vector refers to star "k" observed by star tracker ST1.

Further, the measurements can be derived from the unit vector as follows:

$$H_1(k) = \frac{^{ST1}U_1(1,k)}{^{ST1}U_1(3,k)} \quad \text{Equations (2A) and (2B)}$$

$$V_1(k) = \frac{^{ST1}U_1(2,k)}{^{ST1}U_1(3,k)}$$

The star tracker 218 may also report the stars' magnitudes, in addition to their positions.

If the star tracker 218 is rigidly attached to the spacecraft body 102, the star tracker reference frame 412 is another type of spacecraft body-fixed frame. Neglecting launch vibration, and or cumulative thermal deformation, a time-invariant transformation between the spacecraft body-fixed frame and the star tracker reference frame 412, can be defined. This transformation is typically expressed in terms of a direction cosine matrix.

Direction Cosine Computation

Alignment data provides apriori knowledge of the directional cosine matrix. Specifically, $^{(0)}C_B^{ST1}$ represents the apriori knowledge of the directional cosine matrix describing the relationship between the spacecraft 100 body and star tracker ST1, and $^{(0)}C_B^{ST1}$ represents the apriori knowledge of the directional cosine matrix describing the relationship between the spacecraft 100 body and star tracker ST2. With this information, an initial apriori knowledge of a transformation between the star trackers' reference frames can be defined as:

$$C_{ST1}^{ST2} = {}^{(0)}C_B^{ST2}({}^{(0)}C_B^{ST1})^T. \quad \text{Equation (3)}$$

STA Reference Frame and Parameterization of Star-Tracker Misalignments

Figure 5:
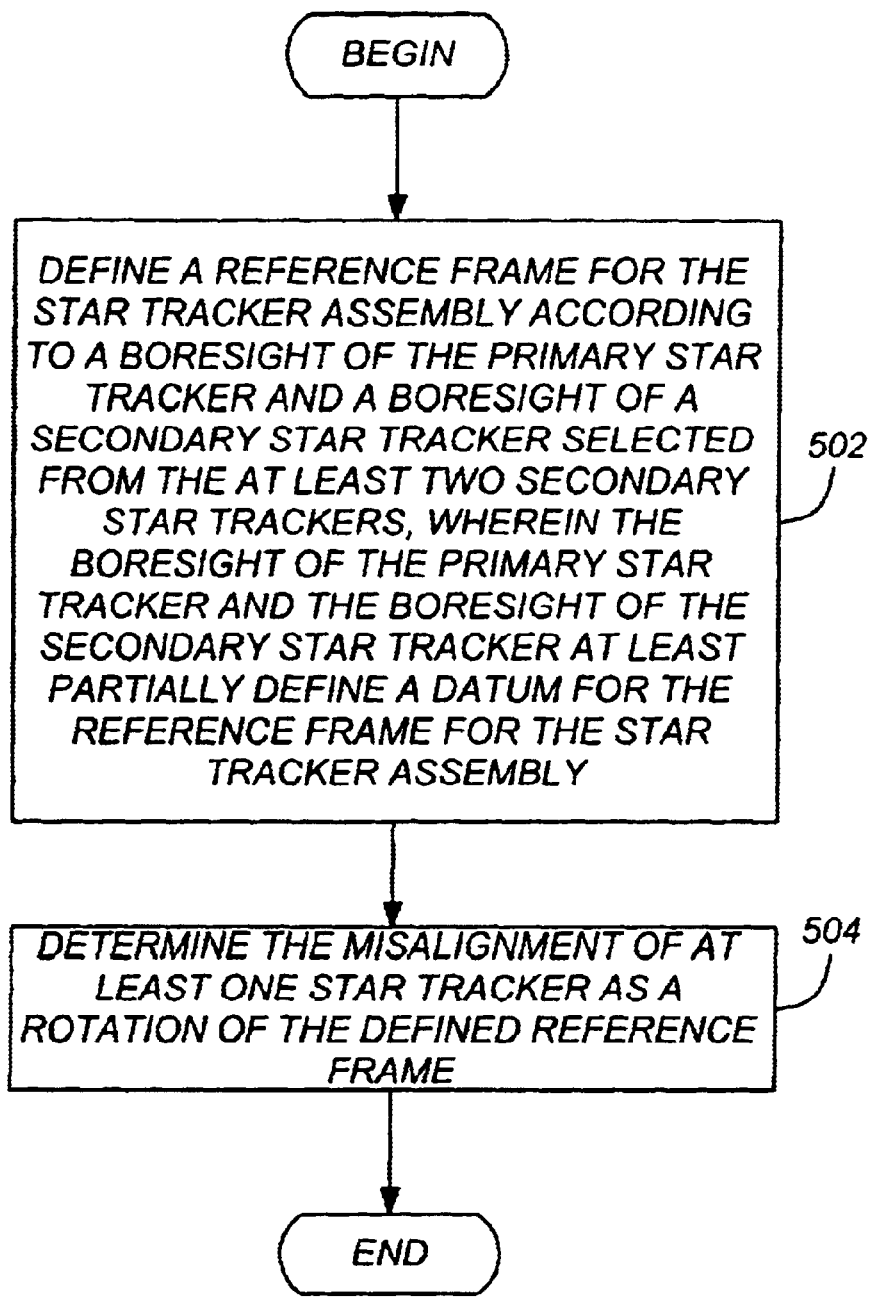
FIG. 5 is a flow chart presenting illustrative method steps used to practice the present invention.

FIG. 5 is a flow chart presenting exemplary method steps used to practice one embodiment of the present invention. First, a reference frame is defined for the star tracker assembly (STA), as shown in block 502.

Figure 6A:
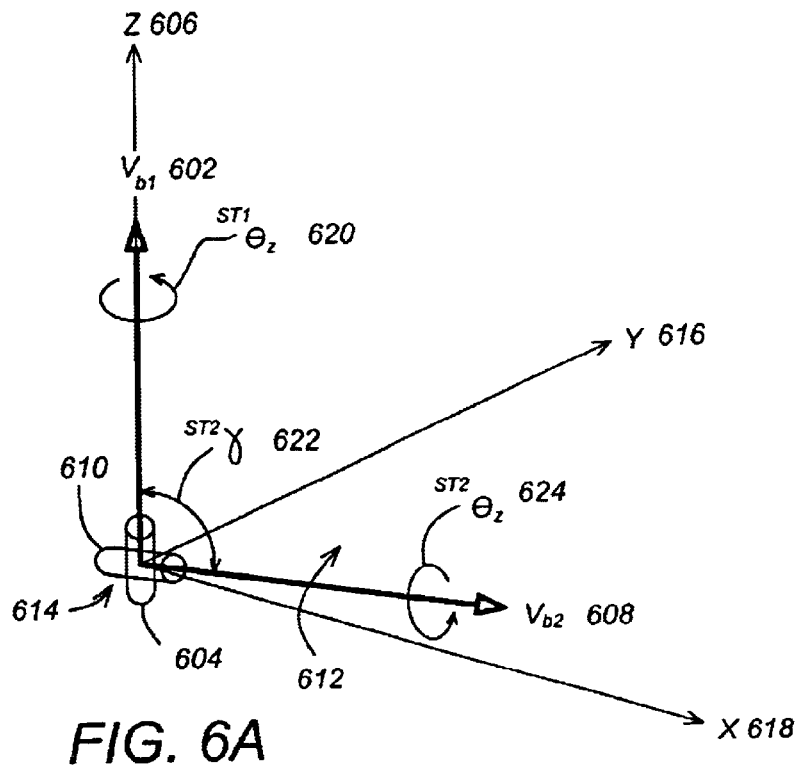
FIGS. 6A and 6B are diagrams showing one embodiment of the reference frame selected for determining the misalignment of the star tracker assembly.
Figure 6B:
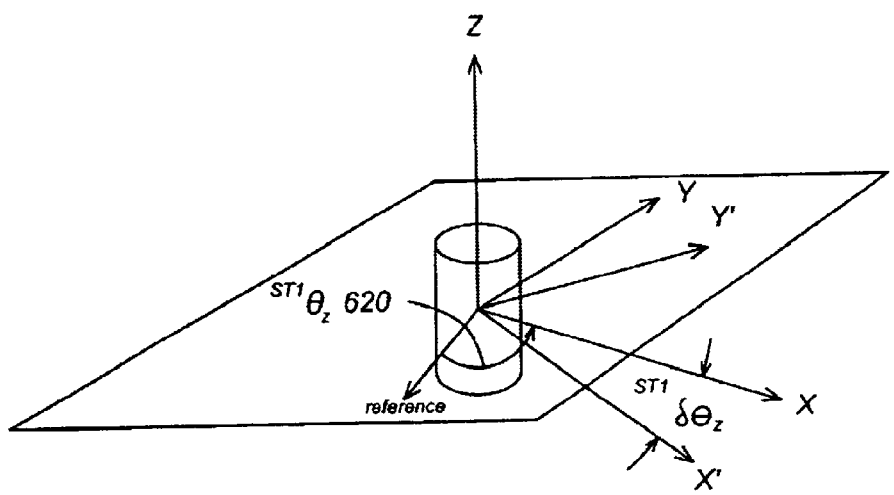

FIGS. 6A and 6B are diagrams showing the STA reference frame 614. The reference frame is defined according to a boresight $V_{b1}$ 602 of a primary star tracker 604 (axis Z 606) and a boresight $V_{b2}$ 608 of a secondary star tracker 610 selected from at least two secondary star trackers. A datum for the STA reference frame is at least partially defined by the boresight of the primary star tracker 602 and a plane 612 spanned by the boresight of the primary star tracker 602 and the boresight of the secondary star tracker 608. The Y axis 616 is orthogonal to the plane 612 spanned by the boresights of the primary and secondary star trackers 602, 608, and the X axis 618 is the cross product of the Y axis 616 and the Z axis 606. This reference frame is used to define an attitude determination (ATD) body frame. The ATD body frame can then be defined to be a fixed rotation away from the STA reference frame. As can be seen, in this definition of STA frame and ATD body frame, the boresight axis of the primary star tracker 602 and the plane 612 spanned by the boresight axis of the primary star tracker 602 and the boresight axis of the secondary star tracker 608 provide an error free datum for further computations.

Returning to FIG. 5, the misalignment of at least one star tracker is determined as a rotation of the reference frame defined above. This is depicted in block 504. In one embodiment, the determination of the misalignments depicted in block 504 includes the steps of determining a first misalignment component as a boresight angular rotation angle error $^{ST1}\delta\theta_z$ 620 about the Z axis 606, determining a second misalignment component as a separation angle error $\delta\gamma$ 622 between the boresight of the primary star tracker 602 and the boresight of the secondary star tracker 608 and a third misalignment component as a boresight rotation angle error $^{ST2}\delta\theta_z$ 624 about the boresight axis (z) of the secondary tracker 618.

The star position errors due to the 3 misalignment parameters are provided below.

For the primary tracker, we have $$\begin{bmatrix} \delta H_1 \\ \delta V_1 \end{bmatrix} = \begin{bmatrix} 0 & ^{ST1}\delta\theta_z \\ -^{ST1}\delta\theta_z & 0 \end{bmatrix} \begin{bmatrix} H \\ V \end{bmatrix} = \begin{bmatrix} V \\ -H \end{bmatrix} {}^{ST1}\delta\theta_z = f_1(H,V)^{ST1}\delta\theta_z$$

For the second tracker, we have $$\begin{bmatrix} \delta H_2 \\ \delta V_2 \end{bmatrix} = \begin{bmatrix} 0 & ^{ST2}\delta\theta_z \\ -^{ST2}\delta\theta_z & 0 \end{bmatrix} \begin{bmatrix} H \\ V \end{bmatrix} + \begin{bmatrix} -\delta\gamma\cos^{ST2}\theta_z \\ \delta\gamma\sin^{ST2}\theta_z \end{bmatrix} =$$

$$\begin{bmatrix} V & -\cos^{ST2}\theta_z \\ -H & \sin^{ST2}\theta_z \end{bmatrix} \begin{bmatrix} \delta\theta_z \\ \delta\gamma \end{bmatrix} = f_2(H,V) \begin{bmatrix} \delta\theta_z \\ \delta\gamma \end{bmatrix}$$

Misalignment Component Estimation

The value of these components can be determined as follows. First, apriori knowledge of the STA frame can be used to derive the following three matrices:

$$^{(0)}C_B^{STA}, {}^{(0)}C_{STA}^{ST1}, {}^{(0)}C_{STA}^{ST2} \quad \text{Equation (4)}$$

An initial estimate of the primary star tracker boresight rotation angle $^{ST1}\theta_z$ 626 with respect to the STA reference frame is determined. This is accomplished by applying the relationship $^{(0)}C_{STA}^{ST1}$ to apriori knowledge of the primary star tracker boresight rotation angle (typically obtained during ground alignment). The misalignment component $^{ST1}\delta\theta_z$ to be estimated is an error of this angle. An initial estimate of the secondary star tracker boresight rotation angle $^{ST2}\theta_z$ can be similarly determined by applying the relationship $^{(0)}C_{STA}^{ST2}$ to apriori knowledge of the secondary star tracker boresight rotation angle. The misalignment component $^{ST2}\delta\theta_z$ to be estimated is an error of this angle.

A pair of stars observed by the primary and secondary star trackers are then associated with stars in a star catalog. Typically, the stars in the star catalog are presented in the ECI coordinate frame. An ECI unit vector for each star is then computed. For a pair of stars i and k, the unit vectors are expressed as:

$$^{ECI}U_1(k) \text{ and } ^{ECI}U_2(j). \quad \text{Equation (5)}$$

Unit vectors derived from measurements from each star observed by the primary star sensor 610 are transformed into the second star sensor 604's coordinate frame as follows:

$$^{ST2}U_1^m(k) = {}^{(0)}C_{ST1}{}^{ST2}\,{}^{ST1}U_1^m(k).$$ Equation (6)

Further, unit vectors derived from measurements from each star observed by the secondary star sensor 604 are transformed to the first star sensor's 610 coordinate frame as follows:

$$^{ST1}U_2^m(k) = {}^{(0)}C_{ST2}{}^{ST1}\,{}^{ST2}U_2^m(k)$$ Equation (7)

Then, for each pair of stars (k,j), the following derived measurements are formed.

$$y(k,j) = <{}^{ST2}U_1^m(k), {}^{ST2}U_2^m(j)> - <{}^{ECI}U_1(k), {}^{ECI}U_2(j)>$$ Equation (8)

This determines the difference between the ideal inner product of the measured star positions and the star positions in the star catalog. Next, coefficient matrices are formed. For each star observed by the primary star sensor 610, the following is formed for each star:

$$f_1(H(k), V(k)) = \begin{bmatrix} V(k) \\ -H(k) \end{bmatrix}$$ Equation (9)

Further, for each star observed by the secondary star sensor 604, the following is formed $$f_2(H, V) = \begin{bmatrix} V & -\cos^{ST2}\theta_z \\ -H & \sin^{ST2}\theta_z \end{bmatrix}$$ Equation (10)

wherein the boresight rotation angle $^{ST2}\theta_z$ is computed as described above. Next, the following 4×3 matrix is formed for each pair of stars:

$$M(k,j) \equiv [{}^{ST2}U_1^m(1,k)\ {}^{ST2}U_1^m(2,k)\ {}^{ST1}U_2^m(1,j)\ {}^{ST1}U_2^m(2,j)]$$

$$\begin{bmatrix} 0 & f_2(H(j), V(j)) \\ f_1(H(k), V(k)) & 0 \end{bmatrix}$$

Equation (11)

As a result, for each pair of star measurements, the following measurement equation is obtained:

$$y(k,j) = M(i,j) \begin{bmatrix} {}^{ST1}\delta\theta_z \\ {}^{ST2}\delta\gamma \\ {}^{ST2}\delta\theta_z \end{bmatrix} + v(k,j)$$ Equation (12)

An estimate of the parameters:

$$\begin{bmatrix} {}^{ST1}\delta\theta_z \\ {}^{ST2}\delta\gamma \\ {}^{ST2}\delta\theta_z \end{bmatrix}$$ Equation (13)

can now be obtained using least squared estimation or other techniques.

Corrected directional cosine matrices can be derived as follows:

$$^{(1)}C_{STA}{}^{ST1} = R_z({}^{ST1}\delta\theta_z){}^{(0)}C_{STA}{}^{ST1}$$

$$^{(1)}C_{STA}{}^{ST2} = R_z({}^{ST2}\delta\theta_z + {}^{ST2}\theta_z)R_y(\delta\gamma)R_z(-{}^{ST2}\theta_z){}^{(0)}C_{STA}{}^{ST2}$$ Equations (14A) and (14B)

As a result, an updated estimate of the directional cosine matrices (indicated by the (1) superscript), can be obtained from the initial (apriori) directional cosine matrices (indicated by the (0) superscript). If further iteration is required, the same relationship is used, wherein the updated estimate (1) is substituted for the apriori information (2), and the application of the equation results in an estimate (3).

In addition, the 3 parameters described above in Equation (13) typically change with temperature. And it is often necessary to further represent these parameters by some base functions such as sine and cosine functions that characterize the diurnal errors.

For parameter $p = {}^{ST1}\delta\theta, \delta\gamma, {}^{ST2}\delta\theta$, $$p = \sum_{s=1,2,\ldots N} A_p(s)\phi(t,s) =$$ Equation (15)

$$[\phi(t,1)\ \phi(t,2)\ \cdots\ \phi(t,N)] \begin{bmatrix} A_p(1) \\ A_p(2) \\ \vdots \\ A_p(N) \end{bmatrix} =$$

$$\Phi(t)A_p$$

where s are integers, $A_p(s)$ are the coefficients and $\phi(t,s)$ are base functions. An example of the base functions are cosine and sine functions, i.e.

$$\phi(t,s) = \cos\left((s-1)2\pi\frac{t}{T}\right) \text{ or }$$

$$\phi(t,s) = \sin\left((s-1)2\pi\frac{t}{T}\right)$$

Equations (16A) and (16B)

where T is the satellite 100 orbit period. In such cases, the measurement equation becomes $$y(k,j) = \begin{bmatrix} {}^{ST2}U_1^m(1,k) \\ {}^{ST2}U_1^m(2,k) \\ {}^{ST1}U_2^m(1,j) \\ {}^{ST1}U_2^m(1,j) \end{bmatrix}^T \begin{bmatrix} 0 & f_2(H(j), V(j)) \\ f_1(H(k), V(k)) & 0 \end{bmatrix}$$

$$\begin{bmatrix} \Phi(t) & 0 & 0 \\ 0 & \Phi(t) & 0 \\ 0 & 0 & \Phi(t) \end{bmatrix} \begin{bmatrix} A1 \\ A2 \\ A3 \end{bmatrix} + v(k,j)$$

Equation (17)

where A1, A2 and A3 are the coefficient vectors for the 3 parameters $$^{ST1}\delta\theta, \delta\gamma, {}^{ST2}\delta\theta,$$

Using the above equations, a least square estimator for the misalignment modeling parameters can be constructed. The estimator may be a batch estimator, which is suitable where some or all of the computations are performed by a ground station instead or in addition to the satellite 100, or a recursive estimator, which is typically implemented solely in the satellite 100.

Kalman Filter Background

Figure 7:
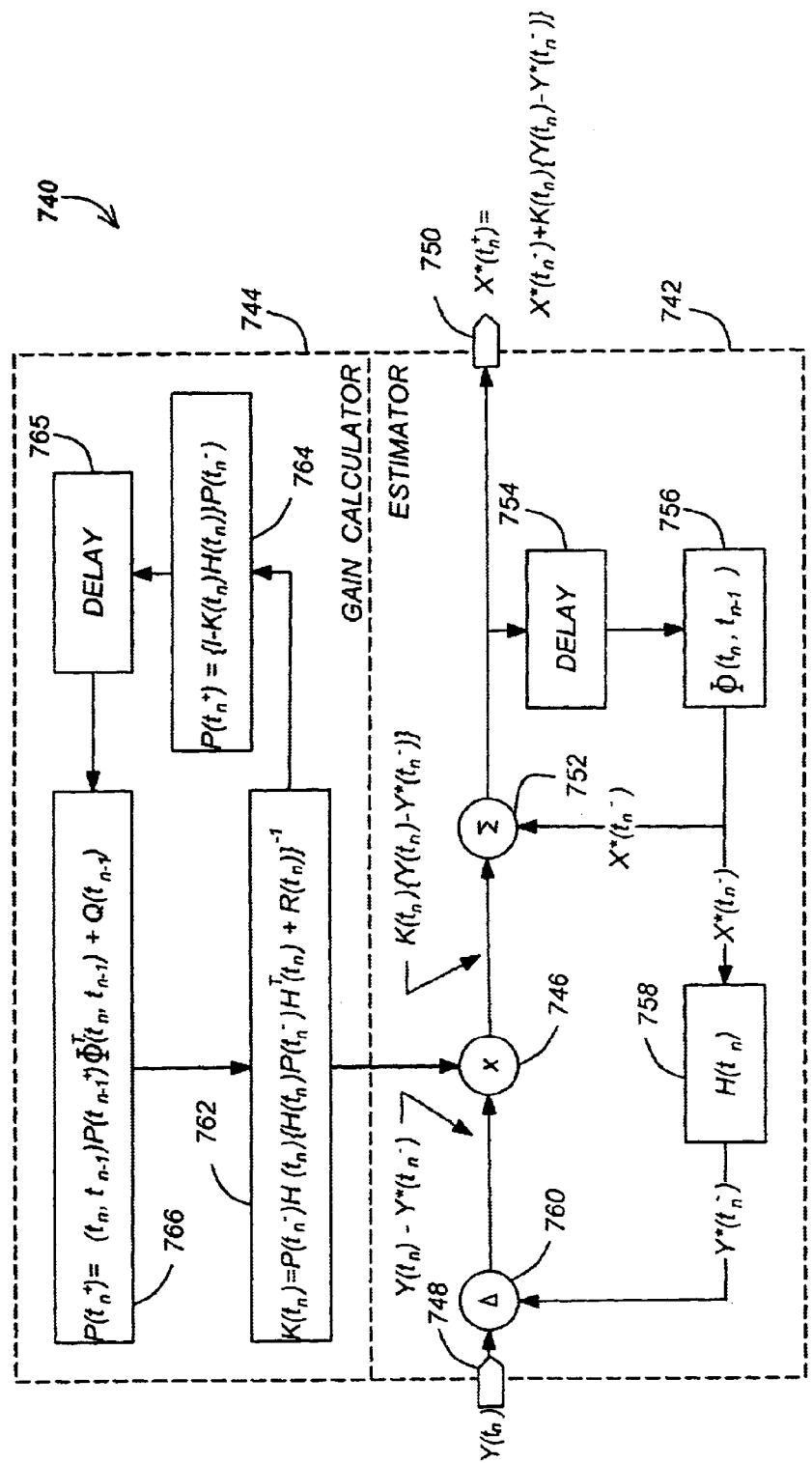
FIG. 7 is a block diagram of a generic Kalman filter.

FIG. 7 illustrates a process that is based on an estimate update equation $$x^*(t_n^+) = x^*(t_n^-) + k(t_n)\{y(t_n) - y^*(t_n^-)\}$$ Equation (18)

in which a state prediction $x^*(t_n^-)$ is updated by a portion $k(t_n)$ of a residue which is the difference between a measurement $y(t_n)$ and a measurement prediction $y^*(t_n^-)$ to thereby form an estimate $x^*(t_n^+)$. The portion $k(t_n)$ is typically referred to as the Kalman gain and is calculated as $$k(t_n) = \frac{\sigma_{\hat{x}}^2(t_n^-)}{\sigma_{\hat{x}}^2(t_n^-) + \sigma_m^2} \quad \text{Equation (19)}$$

in which $\sigma_{x^*}^2(t_n^-)$ is the estimate variance (i.e., uncertainty of the estimate) and $\sigma_m^2$ is the measurement variance (i.e. the uncertainty of the measurement).

As the process is recursively continued, the estimate variance is reduced below the measurement variance so that the gain $k(t_n)$ declines to a value much less than one. It is apparent from equation (18) therefore, that a large portion of the residue $\{y(t_n)-y^*(t_n^-)\}$ is initially used to update the state prediction $x^*(t_n^-)$ into the updated estimate $x^*(t_n^+)$, but this portion decreases as the process continues (i.e. the weight given to new measurements are successively reduced). In particular, the estimate variance is reduced at each measurement $y(t_n)$ in accordance with $$\sigma_{x^*}^2(t_n^+) = (1-k(t_n))\sigma_{x^*}^2(t_n^-) \quad \text{Equation (20)}$$

These processes are expressed in a more general matrix form in FIG. 7 where they are partitioned into an estimator 742 and a gain calculator 744 that supplies gain $K(t_n)$ to a multiplier 746 of the estimator. The estimator 742 receives a measurement $Y(t_n)$ at an input port 748 and provides an estimate $X^*(t_n^+)$ for a time just after the measurement to an output port 750. From this estimate matrix, a state prediction $X^*(t_n^-)$ is formed for a time just before the next measurement and this state prediction is provided to a summer 752.

Because the state of the system typically varies dynamically between measurements, the estimate $X^*(t_n^+)$ must be extrapolated over time to form the state prediction $X^*(t_n^-)$. This extrapolation is accomplished by passing the estimate $X^*(t_n^+)$ through a delay 754 and multiplying it by a state transition 756 which contains extrapolation information in the form of a state transition $\Phi(t_n,t_{n-1})$. The state prediction $X^*(t_n^-)$ is also multiplied by a measurement converter 758 to form a measurement prediction $Y^*(t_n^-)$ which is provided to a differencer 760 where it is differenced with the measurement $Y(t_n)$. The measurement converter 758 $H(t_n)$ conditions the state prediction $X^*(t_n^-)$ so that its elements correspond to those of the measurement $Y(t_n)$ and can be properly differenced with it.

The differencer 760, therefore, generates a residue $Y(t_n)-H(t_n)Y^*(t_n^-)$ which is then multiplied by multiplier 746 to form a correction $K(t_n)\{Y(t_n)-H(t_n)Y(t_n^-)\}$ that will be used to update the estimate. The updating is performed in the summer 752 where the correction is summed with the state prediction $X^*(t_n^-)$ to generate the updated estimate $$X^*(t_n^+) = X^*(t_n^-) K(t_n) \{Y(t_n)-H(t_n)Y(t_n^-)\} \quad \text{Equation (21)}$$

at the output port 750.

The gain calculator 744 performs similar updating and extrapolation processes for the gain $K(t_n)$ The estimate variance $\sigma_{x^*}^2(t_n^-)$ and the measurement variance $\sigma_m^2$ of Equation (19) are respectively replaced by an error covariance $P(t_n)$ and a measurement noise covariance $R(t_n)$ which are measures of estimate error and of measurement error. In particular, the error covariance $P(t_n)$ is defined as $$P(t_n) = E\{(X(t_n)-X^*(t_n))(X^*(t_n)-X(t_n))^T\} \quad \text{Equation (22)}$$

in which $E\{\bullet\}$ is the expected value of the argument $\bullet^T$ refers to the transpose operation. If the difference between a sate parameter and its estimate is referred to as estimation error and shortened to "err", then equation (22) becomes $$P(t_n) = E\{\text{err}(X)\text{err}(X)^T\} \quad \text{Equation (23)}$$

When these replacements are made in equation (2), the calculation of gain becomes $$K(t_n) = P(t_n^-)H^T(t_n)\{H(t_n)P(t_n^-)H^T(t_n)+R(t_n)\}^- \quad \text{Equation (24)}$$

in which the error covariance $P(t_n)$ is appropriately modified by the measurement converter $H(t_n)$ and its transform $H^T(t_n)$. The extrapolation process of Equation (24) is performed by the gain calculation of block 762.

The error covariance $P(t_n)$ is updated between measurements in an update block 764 wherein the estimate variance $\sigma_{x^*}^2(t_n)$ of equation (20) has been replaced by the error covariance $P(t_n)$ as modified by the measurement converter $H(t_n)$. Accordingly, the updated error covariance $P(t_n)$ is processed as $$P(t_n) = \{I-K(t_n)H(t_n)\}P(t_n^-) \quad \text{Equation (25)}$$

The updated error covariance is then passed through a delay 765 and extrapolated over time to form an error covariance $P(t_n^-)$. As shown in extrapolation block 766, this extrapolation is processed as $$P(t_n^-) = \Phi(t_n,t_{n-1})P(t_n^+)\Phi^T(t_n,t_{n-1})+Q(t_{n-1}) \quad \text{Equation (26)}$$

and is effected with the state transition $\Phi(t_n,t_{n-1})$ and its transform. In addition, plant or process noise, which includes modeling errors as well as actual noise and system disturbances, is summarized in a process-noise covariance $Q(t_{n-1})$ In summary, the gain calculator 744 updates the error covariance $P(t_n)$ in update block 764, delays it in delay 765, and extrapolates it in extrapolation block 66 to generate the error covariance $P(t_n^-)$. The updated, delayed, and extrapolated error covariance in extrapolation block 766 is then combined with the measurement-noise covariance $R(t_n)$ in the gain calculation block 762 to calculate a gain $K(t_n)$ which is provided to the estimator 722 for processing the current measurement $Y(t_n)$ at the input port 750. The update block 764 indicates that the error covariance $P(t_n)$ will reduce over time to steady state operational values $P_o$.

Misalignment Estimation Using Gyro and Star Tracker Data

Both gyro and star-tracker data can be used to estimate STA misalignment. This algorithm produces both the spacecraft attitude and the tracker-to-tracker misalignment estimates and any other estimates (such as gyro bias) typically estimated by the attitude determination Kalman Filter.

To begin, consider a Kalman Filter design without misalignment. For example, a simple six-state Kalman Filter that estimates the attitude error and gyro bias based on the following state equations:

$$\frac{d}{dt}\begin{bmatrix} \delta\theta \\ \delta b \end{bmatrix} = \begin{bmatrix} 0 & C_B^{ECI} \\ 0 & 0 \end{bmatrix}\begin{bmatrix} \delta\theta \\ \delta b \end{bmatrix} + \begin{bmatrix} C_{ECI}^B ARW \\ RRW \end{bmatrix} \quad \text{Equation (27)}$$

and the following measurement equation $$y = \begin{bmatrix} \delta h \\ \delta v \end{bmatrix} = [H_1 \quad 0_{2\times 3}]\begin{bmatrix} \delta\theta \\ \delta b \end{bmatrix} + V \quad \text{Equation (28)}$$

where $$\begin{bmatrix} \delta\theta \\ \delta b \end{bmatrix}$$

are the 6 states of the filter, 3 attitude errors in the ECI frame and 3 gyro biases, ARW is the angle random walk noise of the gyro, RRW is the rate random walk of the gyro, V is the star tracker measurement error, Y is the measurement residue of a star position measurement, and $H_1$ is 2×3 matrix that maps the attitude error to star position error.

The above equations are based on the assumption that there is no misalignment induced error in the measurement y. If the misalignment error parameterized above is included, the following equations result. For star tracker ST1 measurements, $$y = \begin{bmatrix} \delta h \\ \delta v \end{bmatrix} = [H_1 \quad 0_{2\times 3}] \begin{bmatrix} \delta\theta \\ \delta b \end{bmatrix} + V + f_1(h,v)\Phi(t)A_1 \quad \text{Equation (29)}$$

For star tracker ST2, measurements $$y = \begin{bmatrix} \delta h \\ \delta v \end{bmatrix} = [H_1 \quad 0_{2\times 3}] \begin{bmatrix} \delta\theta \\ \delta b \end{bmatrix} + \\ V + f_2(h,v) \begin{bmatrix} \Phi(t) & 0 \\ 0 & \Phi(t) \end{bmatrix} \begin{bmatrix} ST2 A_2 \\ ST2 A_3 \end{bmatrix} \quad \text{Equation (30)}$$

To design a Kalman Filter that estimates the attitude errors, gyro biases and the tracker to tracker misalignment parameters all together, an $A_1$ vector for ST1 is included, and $A_2$, $A_3$ vectors for ST2 are included in the state vector. The result is the following state equations and measurement equations based on which a Kalman Filter is readily derived:

$$\frac{d}{dt}\begin{bmatrix} \delta\theta \\ \delta b \\ \delta A_1 \\ \delta A_2 \\ \delta A_3 \end{bmatrix} = \begin{bmatrix} 0 & C_B^{ECI} & 0 & 0 & 0 \\ 0 & \alpha_b & 0 & 0 & 0 \\ 0 & 0 & \alpha_{p1} & 0 & 0 \\ 0 & 0 & 0 & \alpha_{p2} & 0 \\ 0 & 0 & 0 & 0 & \alpha_{p3} \end{bmatrix}\begin{bmatrix} \delta\theta \\ \delta b \\ \delta A_1 \\ \delta A_2 \\ \delta A_3 \end{bmatrix} + \begin{bmatrix} C_B^{ECI} ARW \\ RRW \\ PRW_1 \\ PRW_2 \\ PRW_3 \end{bmatrix} \quad \text{Equation (31)}$$

where $\alpha_b$ is a 3×3 diagonal matrix which is zero when gyro bias drift is modeled by a random walk process and non-zero if modeled according to a first order Markov processes, $\alpha_{pk}$, (k=1,2,3) are 3×3 diagonal matrices which are zero when the misalignment parameter $\delta A_1$, $\delta A_2$, $\delta A_3$ drift over time are modeled by a random walk process and non-zero if modeled according to a first order Markov processes, and PRW is the "parameter" random walk that is used to model slow changes of the parameters. The measurement equations for a star in ST1 is derived as:

$$y = \begin{bmatrix} \delta h \\ \delta v \end{bmatrix} = [H_1 \quad 0_{2\times 3} \quad f_1(h,v)\Phi(t)^{ST1} \quad 0_{2\times 3} \quad 0_{2\times 3}]\begin{bmatrix} \delta\theta \\ \delta b \\ \delta A_1 \\ \delta A_2 \\ \delta A_3 \end{bmatrix} + V \quad \text{Equation (32)}$$

The measurement equations for a star in ST2 is derived as:

$$y = \begin{bmatrix} \delta h \\ \delta v \end{bmatrix} = \begin{bmatrix} H_1 & 0_{2\times 3} & 0 & f_2(h,v)\begin{bmatrix} \Phi(t) & 0 \\ 0 & \Phi(t) \end{bmatrix} \end{bmatrix}\begin{bmatrix} \delta\theta \\ \delta b \\ \delta A_1 \\ \delta A_2 \\ \delta A_3 \end{bmatrix} + V \quad \text{Equation (33)}$$

with the above equations, a Kalman filter with "built-in" misalignment estimation is readily built using the known Kalman Filter techniques described above.

Figure 8:
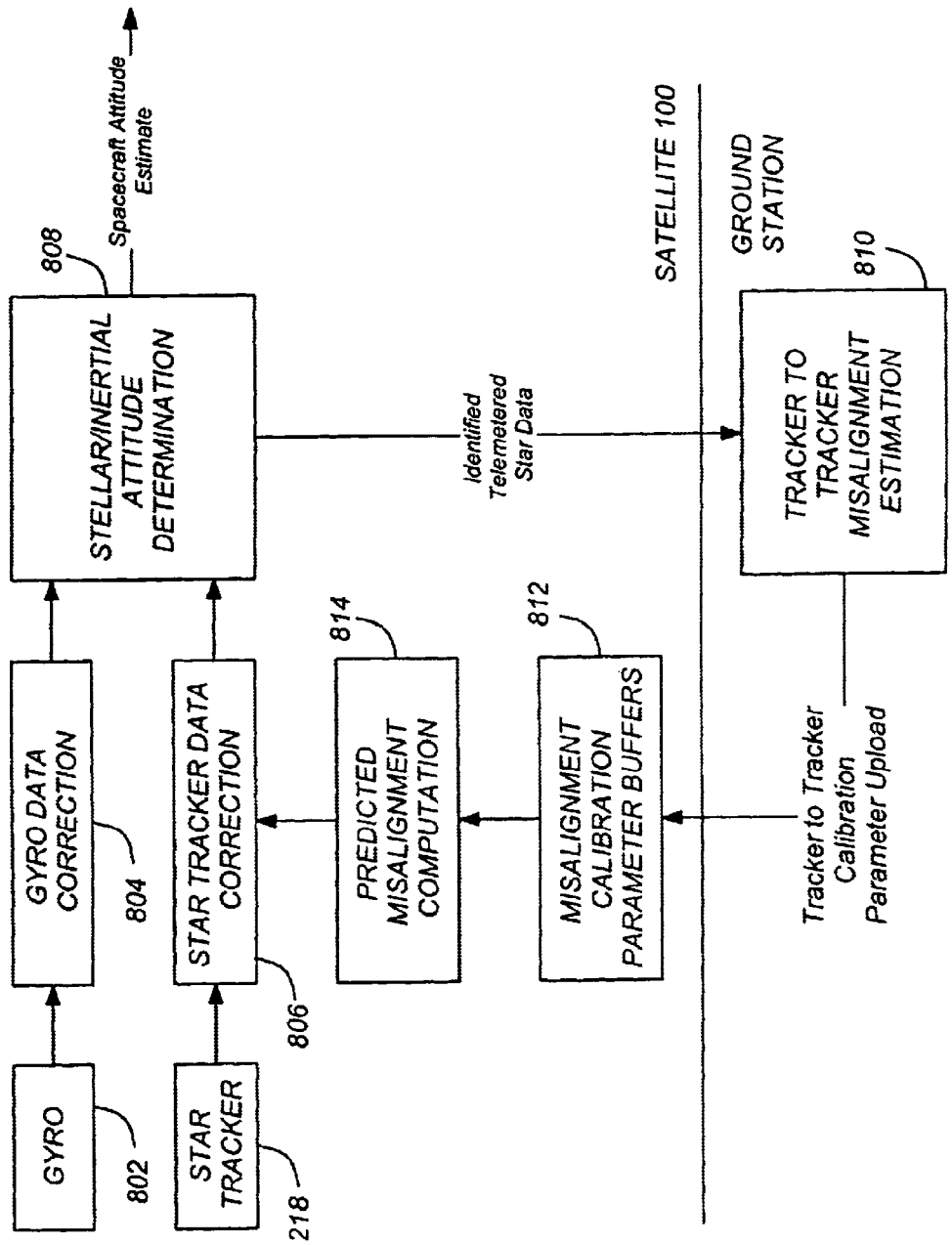
FIG. 8 is a block diagram showing an embodiment of the present invention in which at least some of the computations performed to determine calibration parameters are performed at a ground station.

Spacecraft/Ground Cooperative Approach for Tracker-to-Tracker Misalignment Correction FIG. 8 is a block diagram showing an embodiment where the spacecraft 100 and ground segment each perform some of the computations in computing STA misalignment. Data from the star tracker 218 is provided to a star tracker data correction module 806, and thence to a stellar/inertial attitude determination module 808, which produces a spacecraft 100 attitude estimate for the remainder of the satellite navigation system. Telemetered data regarding the identified star(s) is transmitted to the ground station, where a module 810 computes star tracker to star tracker misalignments. The resulting calibration parameters are uploaded to the spacecraft 100, and stored in buffers 812. A prediction of the misalignment is computed by the misalignment prediction module 814. This data is used to correct the star observations from the star tracker 802. If desired, data from a gyro 802 in the inertial reference unit 208 can be provided to a correction module 804 and thence to the attitude determination module 808. This embodiment minimizes demands on the spacecraft processor 202.

The operations described above can be performed periodically to account for seasonal changes of the estimated parameters. The operations can also be performed after some events that may change the values of the misalignments. The operational period is determined based on the performance requirements and environment stability. Daily, weekly, monthly or even once for the whole life of the spacecraft are possible.

In another embodiment of the present invention, all of the modules and operations depicted in FIG. 8 are performed by the satellite 100. This allows updates of estimated parameters to be computed used on a more rapid basis, thus increasing performance. In addition, this simplifies operational procedures and reduces or obviates the need for ground software to perform the same functions. This embodiment also allows the estimation of the misalignment parameters to be integrated with the remainder of the algorithms used to determine the attitude of the satellite.

Figure 9:
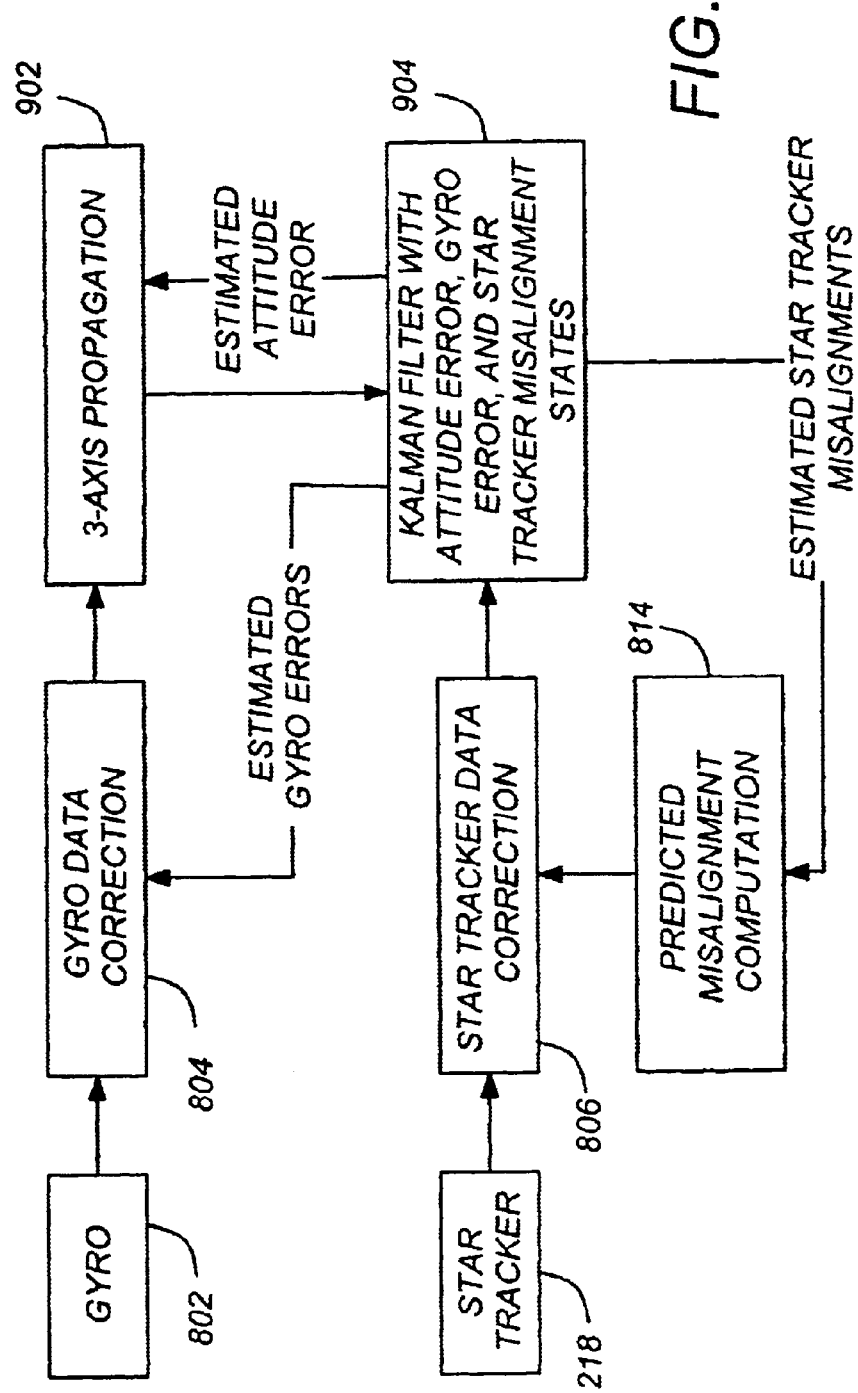
FIG. 9 is a block diagram showing an embodiment of the present invention in which the calibration parameters are performed on-board the satellite, and are integrated with stellar/inertial attitude estimation system.

FIG. 9 is a functional block diagram depicting an embodiment of the present invention wherein the operations are performed by the satellite 100 and wherein the misalignment parameter estimation is integrated with other attitude determination functions and implemented in a Kalman filter 904. Here, star tracker 218 data and gyro 802 data are corrected using estimates of the gyro errors and star tracker misalignment errors generated by the Kalman filter 904. Hence, star tracker misalignment computations are used not only to correct the star tracker data, but in the algorithms used in the attitude determination module 902 as well.

Conclusion

This concludes the description of the preferred embodiments of the present invention. In summary, the present invention describes a method, apparatus, for determining the attitude of the misalignment of a star tracker assembly.

The foregoing description of the preferred embodiment of the invention has been presented for the purposes of illustration and description. For such exemplary purposes, the methods and systems presented herein have been described with respect to a the tracking of single stars from each star tracker. Typically, however, the foregoing operations are completed for multiple star measurements from each star tracker, and such measurements are taken and accumulated across the sky to include hundreds or thousands of measurements from each star tracker.

As such, the foregoing is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of determining a misalignment at least one star tracker of star tracker assembly comprising a primary star tracker and second star tracker, comprising the steps of:

defining a reference frame for the star tracker assembly according to a boresight of the primary star tracker and a boresight of a second star tracker, wherein the boresight of the primary star tracker and a plane spanned by the boresight of the primary star tracker and the boresight of the second star tracker at least partially define a datum for the reference frame for the star tracker assembly; and determining the misalignment of the at least one star tracker as a rotation of the defined reference frame, wherein the step of defining the reference frame for the star tracker assembly comprises the steps of:

defining a first axis (z) of a reference frame for the star tracker such that the boresight of the primary star tracker is aligned with a first (z) axis;

defining a second axis (y) the reference frame orthogonal to the first axis (z) wherein the second axis (y) is orthogonal to a plane spanned by the boresight of the primary star tracker and the boresight of the second star tracker; and defining a third axis (x) of the reference frame according to the cross product of the first axis of the reference frame and the second axis of the reference frame.

2. The method of claim 1, wherein the step of determining the misalignment of the at least one star tracker comprises the steps of:

determining a first misalignment as the error of a boresight angular rotation angle ($^{ST1}\delta\theta_z$) about the first axis (z);

determining a second misalignment as the error of a separation angle ($\delta\gamma$) between the boresight of the primary star tracker and the boresight of the second star tracker; and determining a third misalignment as the error of a boresight rotation angle ($^{ST1}\delta\theta_z$) about the boresight of the second star-tracker.

3. The method of claim 1, wherein the step of determining the misalignment of the at least one star tracker as a rotation of the defined reference frame comprises the steps of:

determining a first misalignment as an angular rotation angle error about the boresight of the primary star tracker;

determining a second misalignment as a separation angle error between the boresight of the primary star tracker and the boresight of the second star tracker; and determining a third misalignment as an angular rotation angle error about the boresight of the second star tracker.

4. The method of claim 3, wherein the first misalignment, the second misalignment, and the third misalignment include time-varying errors.

5. The method of claim 1, wherein the misalignment of the star tracker is estimated according to an estimator using a measurement equation described by:

$$y(k, j) = M(i, j) \begin{bmatrix} ^{ST1}\delta\theta_z \\ ^{ST2}\delta\gamma \\ ^{ST2}\delta\theta_z \end{bmatrix} + v(k, j);$$

wherein y(j,k) represents a measurement derived from of a pair of stars denoted by k and j by taking a difference between the inner products of the measured star unit vector and the unit vector as determined from a star catalogue, and v(k,j) represents measurement noise for the pair of stars denoted by k and j, wherein $^{ST1}\delta\theta_z$, represents the first misalignment angular error, $\delta\gamma$ represents the second misalignment angular error, and $^{ST2}\delta\theta_z$ represents the third misalignment angular error; and wherein $$M(k, j) \equiv [\,^{ST2}U_1^m(1, k) \quad ^{ST2}U_1^m(2, k) \quad ^{ST1}U_2^m(1, j) \quad ^{ST1}U_2^m(2, j)]$$

$$\begin{bmatrix} 0 & f_2(H(j), V(j)) \\ f_1(H(k), V(k)) & 0 \end{bmatrix} \text{ and}$$

$$f_1(H(k), V(k)) = \begin{bmatrix} V(k) \\ -H(k) \end{bmatrix};$$

wherein V(k) is the measured position of star k by the first star tracker in a first star tracker vertical axis, H(k) is the measured position of star k by the first star tracker in a first star tracker horizontal axis;

wherein $$f_2(H(j), V(j)) = \begin{bmatrix} V(j) & -\cos{^{ST2}\theta_z} \\ -H(j) & \sin{^{ST2}\theta_z} \end{bmatrix},$$

wherein V(j) is the m red position of star j by the second star tracker in a second star tracker vertical axis and H(j) is the measured position of star j in a second star tracker horizontal axis, $^{ST2}\theta_z$ is an apriori value for the boresight angular rotation angle about the boresight of the second star tracker;

wherein $^{ST2}U_1^m(1,k)$ is a first element of a unit vector in the second star tracker's reference frame for a position of the star k measured by the primary star tracker, $^{ST2}U_1^m(2,k)$ is a second element of a unit vector in the second star tracker's reference frame for the position of the star k measured by the primary star tracker, $^{ST1}U_2^m(1,j)$ is a first element of a unit vector in the primary star tracker's reference frame for the position of the star j measured by the second star tracker, and $^{ST1}U_2^m(2,j)$ is a second element of a unit vector in the primary star tracker's reference frame for the position of the star j measured by the second star tracker.

6. The method of claim 1, further comprising the steps of:

determining a data correction value for each of the star trackers in the star tracker assembly from the misalignment error; and correcting measurements from each of the star trackers with the data correction values.

7. The method of claim 1, wherein the star tracker assembly is disposed on a satellite, and the step of determining the misalignment of the star tracker assembly comprises the steps of:

transmitting star tracker assembly measurements from the satellite to a ground station;

estimating the misalignment of the star tracker assembly at the ground station; and transmitting the estimated misalignment of the star tracker assembly to the satellite.

8. The method of claim 1, wherein the step of determining a misalignment of the at least one star tracker as a rotation of the defined reference frame comprises the step of applying the measurement to a Kalman filter, the Kalman filter is defined according to:

a state vector representing attitude errors, gyro errors, and star tracker misalignment errors according to the defined reference frame;

an augmented error dynamic model including a state transition matrix, the state transition matrix comprising a matrix modeling spacecraft attitude errors and gyro errors augmented with a model of star tracker misalignment errors wherein variation of parameters in the augmented state transition matrix are modeled by a differential equation having random inputs; and a measurement equation and measurement matrix, the measurement equation and measurement matrix comprising a measurement equation and a measurement matrix modeling spacecraft attitude measurement errors and gyro measurement errors augmented to model star tracker measurement errors.

9. The method of claim 8, wherein:

the augmented error dynamic model is characterized in a continuous time domain by $$\frac{d}{dt}\begin{bmatrix}\delta\theta\\ \delta b\\ \delta A_1\\ \delta A_2\\ \delta A_3\end{bmatrix} = \begin{bmatrix}0 & C_B^{ECI} & 0 & 0 & 0\\ 0 & \alpha_b & 0 & 0 & 0\\ 0 & 0 & \alpha_{p1} & 0 & 0\\ 0 & 0 & 0 & \alpha_{p2} & 0\\ 0 & 0 & 0 & 0 & \alpha_{p3}\end{bmatrix}\begin{bmatrix}\delta\theta\\ \delta b\\ \delta A_1\\ \delta A_2\\ \delta A_3\end{bmatrix} + \begin{bmatrix}C_B^{ECI}ARW\\ RRW\\ PRW_1\\ PRW_2\\ PRW_3\end{bmatrix}$$

wherein $\alpha_b$, is a 3×3 diagonal matrix which is zero when gyro bias drift is modeled by a random walk process and non-zero if modeled according to a first order Markov processes;

$\alpha_{pk}$, (k=1,2,3) are 3×3 diagonal matrices which are zero when the misalignment parameter $\delta A_1$, $\delta A_2$, $\delta A_3$ drift over time are modeled by a random walk process and non-zero if modeled according to a first order Markov processes;

the $\delta\theta$ parameter represents spacecraft attitude errors in an inertial reference frame, the $\delta b$ parameter represents gyro biases, the $\delta A_1$, $\delta A_2$, $\delta A_3$ parameters represent coefficient vectors for the defined reference frame, $C_B^{ECI}$ represents a direction cosine matrix transformation from a spacecraft body reference frame to the inertial reference frame, ARW represents an angle random walk of the gyro, RRW represents a rate random walk of the gyro, $PRW_1$, $PRW_2$, and $PRW_3$ represent slow changes of the parameters $\delta A_1$, $\delta A_2$, $\delta A_3$; and the measurement equation and measurement matrix for the primary star tracker are characterized by $$y = \begin{bmatrix}\delta h\\ \delta v\end{bmatrix} = [H_1 \quad 0_{2\times 3} \quad f_1(h,v)\Phi(t) \quad 0_{2\times 3} \quad 0_{2\times 3}]\begin{bmatrix}\delta\theta\\ \delta b\\ \delta A_1\\ \delta A_2\\ \delta A_3\end{bmatrix} + V$$

and the wherein $H_1$ represents a geometric mapping from an inertial reference frame attitude error to a star position error, $\delta v$ and $\delta h$ represents a difference between measured star position and predicted star position based on known attitude knowledge, $$f_1(h,v) = \begin{bmatrix}v\\ -h\end{bmatrix}$$

wherein v is the measured position of a star by the first star tracker in a first star tracker vertical axis and h is the measured position of the star in a first star tracker horizontal axis; $\Phi(t)$ represents a matrix formed by base functions parameterizing time-varying misalignment parameters $$\begin{bmatrix}^{ST1}\delta\theta_z\\ ^{ST2}\delta\gamma\\ ^{ST2}\delta\theta_z\end{bmatrix},$$

and V represents primary star tracker measurement error; and the measurement equation and measurement matrix for the secondary star tracker is $$y = \begin{bmatrix}\delta h\\ \delta v\end{bmatrix} = \begin{bmatrix}H_1 & 0_{2\times 3} & 0 & f_2(h,v)\begin{bmatrix}\Phi(t) & 0\\ 0 & \Phi(t)\end{bmatrix}\end{bmatrix}\begin{bmatrix}\delta\theta\\ \delta b\\ \delta A_1\\ \delta A_2\\ \delta A_3\end{bmatrix} + V$$

wherein $$f_2(h, v) = \begin{bmatrix} v & -\cos^{ST2}\theta_z \\ h & \sin^{ST2}\theta_z \end{bmatrix},$$

wherein v is a measured position of a star by the second star tracker in a second star tracker vertical axis and h is the measured position of star in a second star tracker horizontal axis, $^{ST2}\theta_z$ is an apriori value for the boresight angular rotation angle about the boresight of the second star tracker.

10. A method for determining a misalignment at least one star tracker of a star tracker assembly comprising a first star tracker and at least one second star tracker, comprising the steps of:

(a) measuring a position of a first star with the first star tracker;

(b) transforming the measured position of the first star in a second star tracker reference frame;

(c) measuring a position of a second star with the second star tracker;

(d) transforming the measured position of the second star in a first star sensor reference frame;

(e) identifying the first star and the second star;

(f) determining a reference position of the identified first star and the identified second star from a star catalog;

(g) computing an inner product of the measured position of the first star and the second star and the reference position of the identified first star and the identified second star, the inner product representing an error in the measured star positions; and (h) equating the error in the measured star positions with a measurement error equation having error parameters $$\begin{bmatrix} ^{ST1}\delta\theta_z \\ \delta\gamma \\ ^{ST2}\delta\theta_z \end{bmatrix},$$

wherein $^{ST1}\delta\theta_z$, represents a first misalignment angular error about a boresight of the primary star tracker, $\delta\gamma$ represents a second misalignment angular error as a separation angle error between the boresight of the primary star tracker and a boresight of the second star tracker, and $^{ST2}\delta\theta_z$, represents the third misalignment angular error as an angular rotation angle about the boresight of the second star tracker; and (i) solving the measurement error equation for the error parameters.

11. The method of claim 10, further comprising the steps of:

measuring a position of a third star with the first star tracker;

transforming the measured position of the third star in the second star tracker reference frame;

measuring a position of a fourth star with the second star tracker;

transforming the measured position of the fourth star in the first star sensor reference frame;

identifying the third star and the fourth star;

determining a second reference position of the identified third star and the identified fourth star from the star catalog;

computing a second inner product of the measured position of the third star and the fourth star and the second reference position of the identified third star and the identified fourth star, the inner product representing a second error in the measured star positions;

computing a third inner product of the measured position of the first star and the fourth star and the second reference position of the identified first star and the identified fourth star, the inner product representing a third error in the measured star position; and equating the error in the measured star positions, the second error in the measured star positions, and the third error in the measured star positions with the measurement error equation and solving the measurement error equation for the error parameters.

12. The method of claim 11, wherein the measurement or equation comprises:

$$y(k, j) = M(i, j) \begin{bmatrix} ^{ST1}\delta\theta_z \\ ^{ST2}\delta\gamma \\ ^{ST2}\delta\theta_z \end{bmatrix} + v(k, j)$$

wherein y(j,k) represents a measurement derived from of a pair of stars denoted by k and j by taking a difference between the inner products of the measured star unit vector and the unit vector as determined from a star catalogue and v(k,j) represents measurement noise for the pair of stars denoted by k and j; and wherein $$M(k, j) \equiv [\,^{ST2}U_1^m(1, k) \quad ^{ST2}U_1^m(2, k) \quad ^{ST1}U_2^m(1, j) \quad ^{ST1}U_2^m(2, j)]$$

$$\begin{bmatrix} 0 & f_2(H(j), V(j)) \\ f_1(H(k), V(k)) & 0 \end{bmatrix}$$

wherein $$f_1(H(k), V(k)) = \begin{bmatrix} V(k) \\ -H(k) \end{bmatrix},$$

wherein V(k) is the measured position of star k by the first star tracker in a first star tracker vertical axis, H(k) is the measured position of star k by the first star tracker in a first star tracker horizontal axis;

wherein $$f_2(H(j), V(j)) = \begin{bmatrix} V(j) & -\cos^{ST2}\theta_z \\ -H(j) & \sin^{ST2}\theta_z \end{bmatrix},$$

wherein V(j) is the measured position of star j by the second star tracker in a second star tracker vertical axis and H(j) is the measured position of star j in a second star tracker horizontal axis, $^{ST2}\theta_z$ is an apriori value for the boresight angular rotation angle about the boresight of the second star tracker;

wherein $^{ST2}U_1^m(1,k)$ is a first element of a unit vector in the second star tracker's reference frame for a position of the star k measured by the primary star tracker, $^{ST2}U_1^m(2,k)$ is a second element of a unit vector in the second star tracker's reference frame for the position of the star k measured by the primary star tracker, $^{ST1}U_2^m(1,j)$ is a first element of a unit vector in the primary star tracker's reference frame for the position of the star j measured by the second star tracker, and $^{ST1}U_2^m(2,j)$ is the is a second element of a unit vector in the primary star tracker's reference frame for the position of the star j measured by the second star tracker.

13. The method of claim 12, further comprising the steps of:
   determining a data correction value for each of the star trackers in the star tracker assembly from the error parameters; and
   correcting measurements from each of the star trackers with the data correction values.

14. The method of claim 10, wherein:
   the method further comprises the step of transmitting star tracker assembly measurements from a satellite to a ground station;
   performing steps (b)–(j) to estimate the error parameters at the ground station; and
   transmitting the error parameters to a satellite.

15. An apparatus for determining a misalignment at least one star tracker of a star tracker assembly comprising a primary star tracker and at least one secondary star tracker, comprising:
   a transformation module for transforming a position of a first star measured by the primary star tracker into a reference frame for a secondary star tracker and for transforming the position of a second star measured by the secondary star tracker into a reference frame for the primary star tracker;
   a star catalog, including reference position for each star described therein;
   a module for computing an inner product of a measured position of the first star and a measured position of the second star and a reference position of the first star and a reference position of the second star, the inner product representing an error in the measured star positions;
   a processor for equating the error in the measured star positions with a measurement error equation having error parameters $$\begin{bmatrix} ^{ST1}\delta\theta_z \\ \delta\gamma \\ ^{ST2}\delta\theta_z \end{bmatrix},$$

wherein $^{ST1}\delta\theta_z$, represents a first misalignment angular error about a boresight of the primary star tracker, $\delta\gamma$ represents a second misalignment angular error as a separation angle error between the boresight of the primary star tracker and a boresight of the secondary star tracker, and $^{ST2}\delta\theta_z$, represents the third misalignment angular error as an angular rotation angle about the boresight of the secondary star tracker; for solving the measurement error equation for the error parameters.

16. The apparatus of claim 15, wherein:
   the transformation module further transforms the position of a third star measured by the primary star tracker into a reference frame for a second star tracker and transforms the position of a fourth star measured by the second star tracker star trackers into a reference frame for the primary star tracker;
   the module further computes an second inner product of a measured position of the third star and a measured position of the fourth star and a reference position of the third star and a reference position of the fourth star, the second inner product representing an second error in the measured star positions;
   the module further computes a third inner product of the measured position of the first star and the measured position of the fourth star and a reference position of the first star and a reference position of the fourth star, the third inner product representing a third error in the measured star positions; and
   the processor solves the measurement error equation for the error parameters using the error in the measured star positions, the second error in the measured star positions, and the third error in the measured star positions.

17. The apparatus of claim 15, wherein the measurement equation comprises:

$$y(k, j) = M(i, j) \begin{bmatrix} ^{ST1}\delta\theta_z \\ ^{ST2}\delta\gamma \\ ^{ST2}\delta\theta_z \end{bmatrix} + v(k, j)$$

wherein y(j,k) represents a measurement of a pair of stars denoted by k and j and v(k,j) represents measurement noise for the pair of stars denoted by k and j; and wherein $$M(k, j) \equiv \begin{bmatrix} ^{ST2}U_1^m(1, k) & ^{ST2}U_1^m(2, k) & ^{ST1}U_2^m(1, j) & ^{ST1}U_2^m(2, j) \end{bmatrix}$$
$$\begin{bmatrix} 0 & f_2(H(j), V(j)) \\ f_1(H(k), V(k)) & 0 \end{bmatrix}$$

wherein $$f_1(H(k), V(k)) = \begin{bmatrix} V(k) \\ -H(k) \end{bmatrix},$$

wherein V(k) is the measured position of star k by the first star tracker in a first star tracker vertical axis, H(k) is the measured position of star k by the first star tracker in a first star tracker horizontal axis;
wherein $$f_2(H(j), V(j)) = \begin{bmatrix} V(j) & -\cos^{ST2}\theta_z \\ -H(j) & \sin^{ST2}\theta_z \end{bmatrix},$$

wherein V(j) is the measured position of star j by the second star tracker in a second star tracker vertical axis and H(j) is the measured position of star j in a second star tracker horizontal axis, $^{ST2}\theta_z$ is an apriori value for the boresight angular rotation angle about the boresight of the second star tracker;
wherein $^{ST2}U_1^m(1,k)$ is a first element of a unit vector in the second star tracker's reference frame for a position of the star k measured by the primary star tracker, $^{ST2}U_1^m(2,k)$ is a second element of a unit vector in the second star tracker's reference frame for the position of the star k measured by the primary star tracker, $^{ST1}U_2^m(1,j)$ is a first element of a unit vector in the primary star tracker's reference frame for the position of the star j measured by the second star tracker, and $^{ST1}U_2^m(2,j)$ is the second element of a unit vector in the primary star tracker's reference frame for the position of the star j measured by the second star tracker.

18. The apparatus of claim 15, wherein the processor is disposed at a ground station.

19. An apparatus of determining a misalignment at least one star tracker of a star tracker assembly comprising a primary star tracker and at least one secondary star trackers, comprising:
  means for defining a reference frame for the star tracker assembly according to a boresight of the primary star tracker and a boresight of the second star tracker, wherein the boresight of the primary star tracker and a plane spanned by the boresight of the primary star tracker and the boresight of the second star tracker at least partially define a datum for the reference frame for the star tracker assembly; and
  means for determining the misalignment of the at least one star tracker as a rotation of the defined reference frame; wherein the means for defining the reference frame for the star tracker assembly comprises:
    means for defining a first axis (z) of a reference frame for the star tracker such that the boresight of the primary star tracker is aligned with a first (z) axis;
    means for defining a second axis (y) of the reference frame orthogonal to the first axis (z) wherein the second axis (y) is orthogonal to a plane spanned by the boresight of the primary star tracker and the boresight of the second star tracker; and
    means for defining a third axis (x) of the reference frame according to the cross product of the first axis of the reference frame and the second axis of the reference frame.

20. The apparatus of claim 19, wherein the means for determining the misalignment of the at least one star tracker comprises:
  means for determining a first misalignment as a boresight angular rotation angle ($^{ST1}\delta\theta_z$) about the first axis (z);
  means for determining a second misalignment as a separation angle $\delta\gamma$ between the boresight of the primary star tracker and the boresight of the second star tracker; and
  means for determining a third misalignment as a boresight rotation angle ($^{ST2}\delta\theta_z$) about the boresight of the second tracker.

21. The apparatus of claim 19, wherein the means for determining the misalignment of the at least one star tracker as a rotation of the defined reference frame comprises:
  means for determining a first misalignment as an angular rotation angle about the boresight of the primary star tracker;
  means for determining a second misalignment as a separation angle error between the boresight of the primary star tracker and the boresight of the second star tracker; and
  means for determining a third misalignment as an angular rotation angle about the boresight of the second star tracker.

22. The apparatus of claim 21, wherein the misalignment of the star tracker assembly is estimated according to an estimator based on a measurement equation:

$$y(k, j) = M(i, j)\begin{bmatrix} ^{ST1}\delta\theta_z \\ ^{ST2}\delta\gamma \\ ^{ST2}\delta\theta_z \end{bmatrix} + v(k, j)$$

wherein y(j,k) represents a measurement of a pair of stars denoted by k and j and v(k,j) represents measurement noise for the pair of stars denoted by k and j; and wherein $$M(k, j) \equiv \begin{bmatrix} ^{ST2}U_1^m(1, k) & ^{ST2}U_1^m(2, k) & ^{ST1}U_2^m(1, j) & ^{ST1}U_2^m(2, j) \end{bmatrix}$$
$$\begin{bmatrix} 0 & f_2(H(j), V(j)) \\ f_1(H(k), V(k)) & 0 \end{bmatrix}$$

wherein $$f_1(H(k), V(k)) = \begin{bmatrix} V(k) \\ -H(k) \end{bmatrix},$$

wherein V(k) is the measured position of star k by the first star tracker in a first star tracker vertical axis, H(k) is the measured position of star k by the first star tracker in a first star tracker horizontal axis; wherein $$f_2(H(j), V(j)) = \begin{bmatrix} V(j) & -\cos^{ST2}\theta_z \\ -H(j) & \sin^{ST2}\theta_z \end{bmatrix},$$

wherein V(j) is the measured position of star j by the second star tracker in a second star tracker vertical axis and H(j) is the measured position of star j in a second star tracker horizontal axis, $^{ST2}\theta_z$ is an apriori value for the boresight angular rotation angle about the boresight of the second star tracker;

wherein $^{ST2}U_1^m(1,k)$ is a first element of a unit vector in the second star tracker's reference frame for a position of the star k measured by the primary star tracker, $^{ST2}U_1^m(2,k)$ is a second element of a unit vector in the second star tracker's reference frame for the position of the star k measured by the primary star tracker, $^{ST1}U_2^m(1,j)$ is a first element of a unit vector in the primary star tracker's reference frame for the position of the star measured by the second star tracker, and $^{ST1}U_2^m(2,j)$ is the second element of a unit vector in the primary star tracker's reference frame for the position of the star j measured by the second star tracker.

23. The apparatus of claim 21, wherein the first misalignment, the second misalignment, and the third misalignment include time-varying errors.

24. The apparatus of claim 19, further comprising:
  means for determining a data correction value for each of the star trackers in the star tracker assembly from ate misalignment error; and
  means for correcting measurements from each of the star trackers with the data correction values.

25. The apparatus of claim 19, wherein the star tracker assembly is disposed on a satellite, and the means for determining the misalignment of the star tracker assembly comprises:
  means for transmitting star tracker assembly measurements from the satellite to a ground station;
  means for estimating the misalignment of the star tracker assembly at the ground station; and
  means for transmitting the estimated misalignment of the star tracker assembly to a satellite.

26. The apparatus of claim 19, wherein the means for determining a misalignment of the at least one star tracker as a rotation of the defined reference frame comprises means for applying the measurement to a Kalman filter, the Kalman filter is defined according to:

a state vector representing attitude errors, gyro errors, and star tracker misalignment errors according to the defined reference frame;

an augmented error dynamic model including a stare transition matrix, the state transition matrix comprising a matrix modeling spacecraft attitude errors and gyro errors augmented with a model of star tracker misalignment errors wherein variation of parameters in the augmented state transition matrix are modeled by a differential equation having random inputs; and a measurement equation and measurement matrix, the measurement equation and measurement matrix comprising a measurement equation and a measurement matrix modeling spacecraft attitude measurement errors and gyro measurement errors augmented to model star tracker measurement errors.

27. The apparatus of claim 26, wherein:

the augmented error dynamic model is characterized in a continuous time domain by $$\frac{d}{dt}\begin{bmatrix}\delta\theta\\ \delta b\\ \delta A_1\\ \delta A_2\\ \delta A_3\end{bmatrix} = \begin{bmatrix}0 & C_B^{ECI} & 0 & 0 & 0\\ 0 & \alpha_b & 0 & 0 & 0\\ 0 & 0 & \alpha_{p1} & 0 & 0\\ 0 & 0 & 0 & \alpha_{p2} & 0\\ 0 & 0 & 0 & 0 & \alpha_{p3}\end{bmatrix}\begin{bmatrix}\delta\theta\\ \delta b\\ \delta A_1\\ \delta A_2\\ \delta A_3\end{bmatrix} + \begin{bmatrix}C_B^{ECI}ARW\\ RRW\\ PRW_1\\ PRW_2\\ PRW_3\end{bmatrix}$$

wherein $\alpha_b$, is a 3×3 diagonal matrix which is zero when gyro bias drift is modeled by a random walk process and non-zero if modeled according to a first order Markov processes;

$\alpha_{pk}$, (k=1,2,3) are 3×3 diagonal matrices which are zero when the misalignment parameter $\delta A_1$, $\delta A_2$, $\delta A_3$ drift over time are modeled by a random walk process and non-zero if modeled according to a first order Markov processes;

the $\delta\theta$ parameter represents spacecraft attitude errors in an inertial reference frame, the $\delta b$ parameter represents gyro biases, the $\delta A_1$, $\delta A_2$, $\delta A_3$ parameters represent coefficient vectors for the defined reference frame, $C_B^{ECI}$ represents a direction cosine matrix transfomation from a spacecraft body reference frame to the inertial reference frame, ARW represents an angle random walk of the gyro, RRW represents a rate random walk of the gyro, $PRW_1$, $PRW_2$, and $PRW_3$ represent slow changes of the parameters $\delta A_1$, $\delta A_2$, $\delta A_3$; and the measurement equation and measurement matrix for the primary star tracker are characterized by $$y = \begin{bmatrix}\delta h\\ \delta v\end{bmatrix} = \begin{bmatrix} H_1 & 0_{2\times 3} & f_1(h,v)\Phi(t) & 0_{2\times 3} & 0_{2\times 3}\end{bmatrix}\begin{bmatrix}\delta\theta\\ \delta b\\ \delta A_1\\ \delta A_2\\ \delta A_3\end{bmatrix} + V$$

and the wherein $H_1$ represents a geometric mapping from an inertial reference frame attitude error to a star position error, $\delta v$ and $\delta h$ represents a difference between measured star position and predicted star position based on known attitude knowledge, $$f_1(h,v) = \begin{bmatrix}v\\ -h\end{bmatrix}$$

wherein v is the measured position of a star by the first star tracker in a first star tracker vertical axis and h is the measured position of the star in a first star tracker horizontal axis; $\Phi(t)$ represents a matrix formed by base functions parameterizing time-varying misalignment parameters $$\begin{bmatrix}{}^{ST1}\delta\theta_z\\ {}^{ST2}\delta\gamma\\ {}^{ST2}\delta\theta_z\end{bmatrix},$$

and V represents primary star tracker measurement error; and the measurement equation and measurement matrix for the secondary star tracker is $$y = \begin{bmatrix}\delta h\\ \delta v\end{bmatrix} = \begin{bmatrix} H_1 & 0_{2\times 3} & 0 & f_2(h,v)\begin{bmatrix}\Phi(t) & 0\\ 0 & \Phi(t)\end{bmatrix}\end{bmatrix}\begin{bmatrix}\delta\theta\\ \delta b\\ \delta A_1\\ \delta A_2\\ \delta A_3\end{bmatrix} + V$$

wherein $$f_2(h,v) = \begin{bmatrix}v & -\cos{}^{ST2}\theta_z\\ h & \sin{}^{ST2}\theta_z\end{bmatrix},$$

wherein v is a measured position of a star by the second star tracker in a second star tracker vertical axis and h is the measured position of star in a second star tracker horizontal axis, ${}^{ST2}\theta_z$ is an apriori value for the boresight angular rotation angle about the boresight of the second star tracker.

* * * * *